United States Patent
Hösle

(10) Patent No.: US 8,129,881 B2
(45) Date of Patent: Mar. 6, 2012

(54) RING MOTOR

(75) Inventor: Markus Hösle, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 103 days.

(21) Appl. No.: 12/524,501

(22) PCT Filed: Jan. 16, 2008

(86) PCT No.: PCT/EP2008/050447
§ 371 (c)(1),
(2), (4) Date: Jul. 24, 2009

(87) PCT Pub. No.: WO2008/092746
PCT Pub. Date: Aug. 7, 2008

(65) Prior Publication Data
US 2010/0033035 A1    Feb. 11, 2010

(30) Foreign Application Priority Data

Feb. 1, 2007 (DE) .......................... 10 2007 005 131

(51) Int. Cl.
*H02K 1/00* (2006.01)
*H02K 19/02* (2006.01)
*H02K 19/24* (2006.01)

(52) U.S. Cl. ................. 310/216.109; 310/168; 310/181; 310/216.111

(58) Field of Classification Search .................. 310/152, 310/154.08, 154.11, 154.22, 181, 216.008, 310/216.074, 216.109, 216.086, 216.095, 310/111
See application file for complete search history.

(56) References Cited

U.S. PATENT DOCUMENTS

| | | | | |
|---|---|---|---|---|
| 2,968,755 A * | 1/1961 | Baermann | 318/400.41 |
| 3,272,444 A | 9/1966 | Rich et al. | 241/176 |
| 3,984,711 A * | 10/1976 | Kordik | 310/49.46 |
| 4,365,180 A * | 12/1982 | Licata et al. | 310/216.008 |
| 4,713,570 A * | 12/1987 | Mastromattei | 310/181 |
| 5,825,112 A * | 10/1998 | Lipo et al. | 310/181 |
| 6,087,742 A * | 7/2000 | Maestre | 310/12.24 |
| 6,262,508 B1 * | 7/2001 | Shibayama et al. | 310/181 |
| 6,265,804 B1 | 7/2001 | Nitta et al. | |
| 6,777,842 B2 * | 8/2004 | Horst | 310/154.11 |
| 7,122,933 B2 * | 10/2006 | Horst et al. | 310/216.095 |
| 7,148,590 B1 * | 12/2006 | Lampson | 310/12.18 |
| 7,247,967 B2 * | 7/2007 | Ionel et al. | 310/216.086 |
| 2002/0104909 A1 | 8/2002 | Strutz | 241/46.013 |
| 2003/0038557 A1 * | 2/2003 | Strothmann | 310/181 |
| 2007/0222304 A1 | 9/2007 | Jajtic et al. | 310/12.18 |
| 2010/0033035 A1 | 2/2010 | Hösle | 310/49.46 |

FOREIGN PATENT DOCUMENTS

WO    WO2006/032638    3/2006
WO    2008/092746 A1   8/2008

OTHER PUBLICATIONS

Preliminary Examination Report, PCT/EP2008/050447, 7 pages.
International Search Report, PCT/EP2008/050447, 10 pages.

* cited by examiner

*Primary Examiner* — Tran Nguyen
(74) *Attorney, Agent, or Firm* — King & Spalding L.L.P.

(57) ABSTRACT

A ring motor (1) as a direct drive, particularly for vertical mills or rod mills, has a stator (6) and a rotor (12) configured as a rotating milling body (10), wherein the stator (6) has at least two different excitation systems, and the milling body (10) has only a toothed structure, which electromagnetically interacts with the excitation systems of the stator (6) and thus brings about a rotation of the milling body (10).

13 Claims, 12 Drawing Sheets

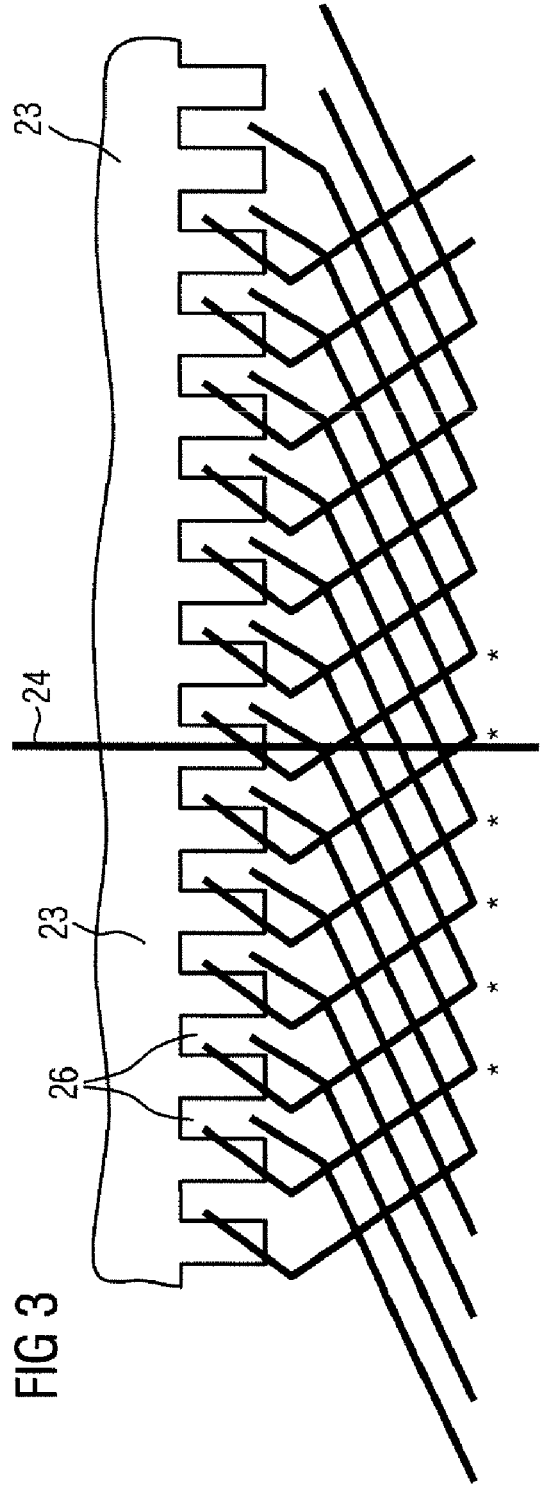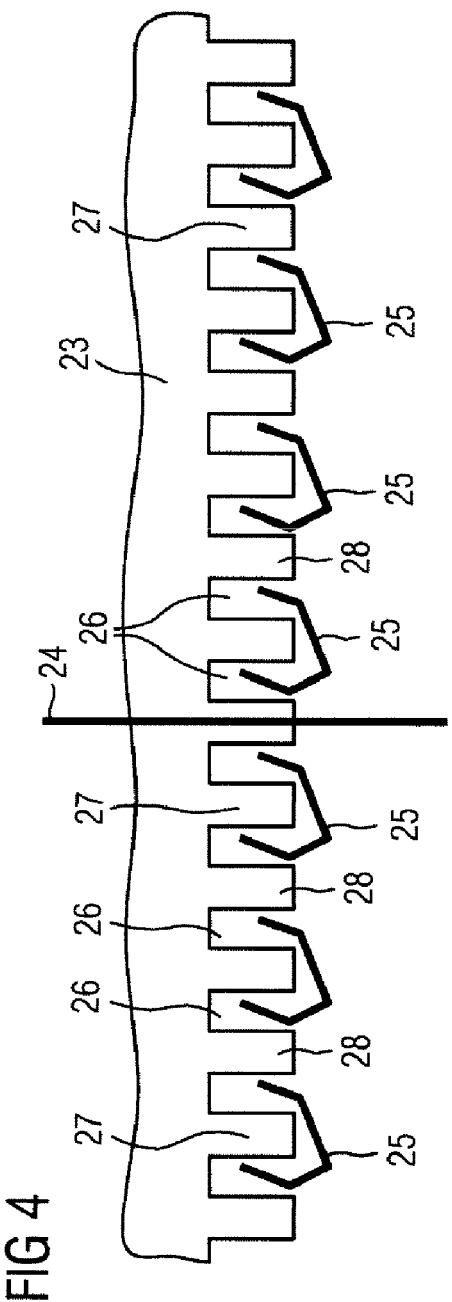
FIG 3
FIG 4

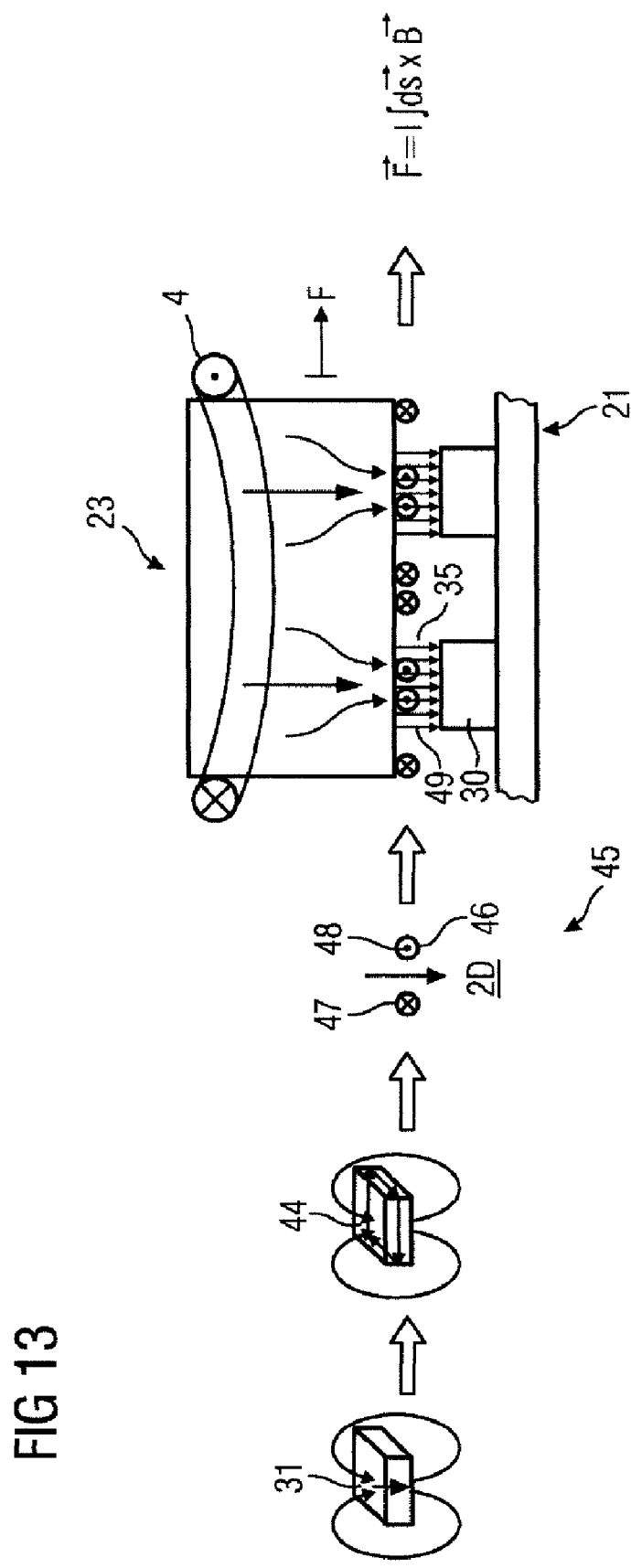

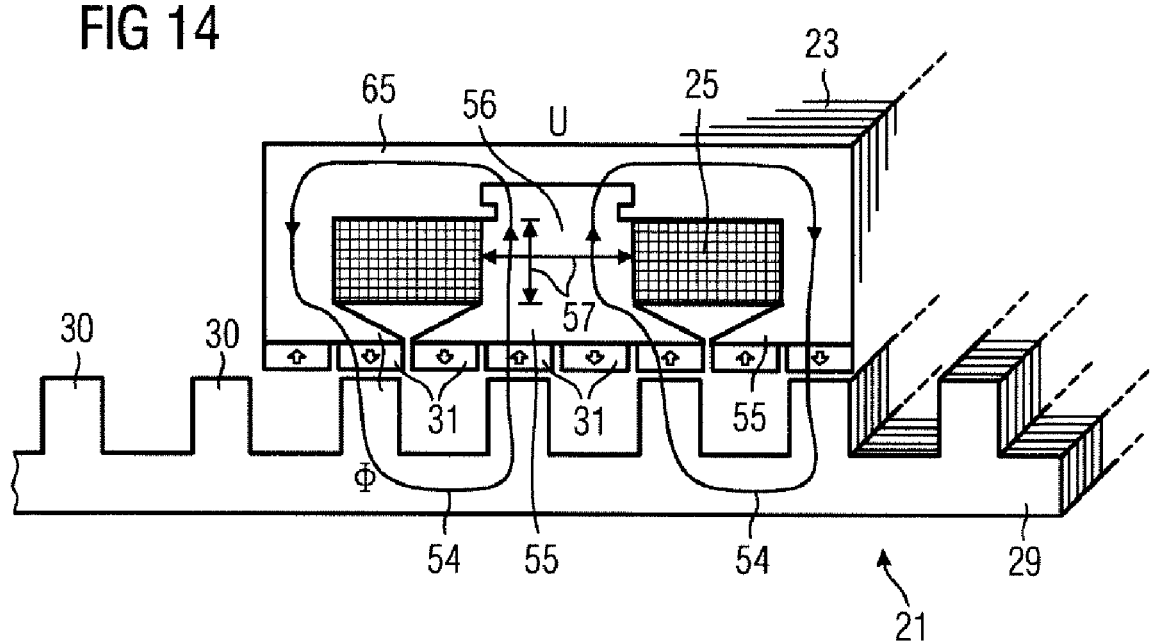
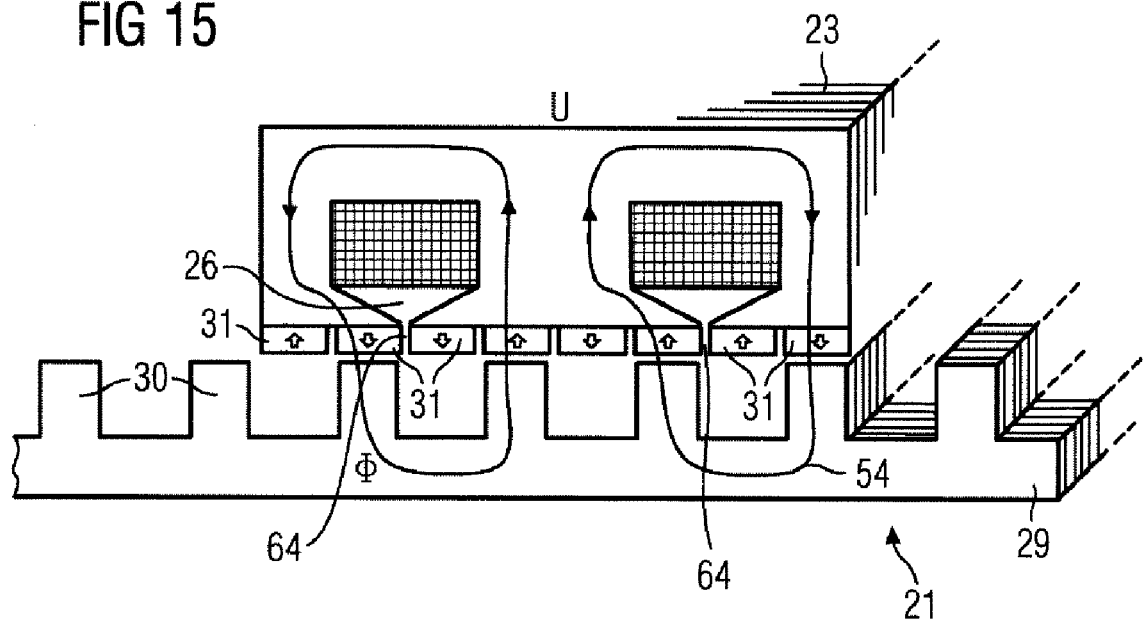

RING MOTOR

CROSS-REFERENCE TO RELATED APPLICATIONS

This application is a U.S. National Stage Application of International Application No. PCT/EP2008/050447 filed Jan. 16, 2008, which designates the United States of America, and claims priority to German Application No. 10 2007 005 131.1 filed Feb. 1, 2007, the contents of which are hereby incorporated by reference in their entirety.

TECHNICAL FIELD

The invention relates to a ring motor as a direct drive, particularly for ore mills or rod mills, comprising a stator and a rotor configured as a rotating mill body.

BACKGROUND

For a long time, a direct drive of a horizontally arranged mill body has been provided in so-called mill drives, such as are used for milling cement or ores, in particular copper ores. For this purpose, the dynamo-electric drive motor is arranged concentrically with respect to the mill body, wherein the rotor and stator have comparatively large diameters in the region of greater than 5 m (U.S. Pat. No. 3,272,444).

At the same time, the rotor shaft is formed by the mill body itself, which is provided with a ring flange for fixing the active rotor parts. At the same time, the rotor has several segments, which carry one or more magnetic poles. Each of these segments is provided with a supporting ligament which runs in the circumferential direction of the rotor and is mechanically connected to the ring flange of the mill body.

The primary component of a ring motor of this kind, the stator, is designed for energizing with electric current. For this purpose, it has a winding system distributed over the slots of the stator. As described above, the secondary component has individual rotor segments which are provided with permanent magnets or windings which can be energized. The ring motor therefore has a primary component and a secondary component, each having active magnetic means which can be called upon to generate a magnetic field. Examples of active magnetic means are windings that can be energized, permanent magnets or windings in which an electrical current flow can be produced by means of induction, wherein a magnetic field can be generated by means of the electrical current flow that can be produced.

A disadvantage, particularly because of the comparatively large dimensions of these direct drives, is the assembly on site, as the components, such as stator or rotor, cannot be transported as a complete arrangement. The stator and rotor of the direct drive must therefore also be divided into segments to obtain suitable dimensions for transportation. Accordingly, assembly on site is difficult, as a predominant part of the winding systems must be fitted into the stator slots, insulated and tested on site. Likewise, positioning the active magnetic means on the rotor necessitates laborious and therefore time-consuming assembly.

Because, among other things, of the increased dielectric requirements imposed on the winding systems, the application of operationally suitable insulation outside the factory is also problematic, for one thing because of the dust-laden environment.

SUMMARY

According to various embodiments, a ring motor can be created, which can be easily manufactured, transported and assembled in the plant without major assembly effort. In doing so, it must be possible to carry out all electrical tests in the factory without having to fit and test additional windings in the plant. Furthermore, the fitting of rotor poles must be simplified in order to make magnetization on site or the fitting of already pre-magnetized parts easier.

According to an embodiment, a ring motor as a direct drive, particularly for ore mills or rod mills, may comprise a stator and a rotor configured as a rotating mill body, wherein the stator has at least two different excitation systems, and the mill body has a toothed structure, which electromagnetically interacts with the excitation systems of the stator and thus brings about a rotation of the mill body.

According to a further embodiment, the excitation systems can be designed as a winding system through which current flows and as a permanent magnet system. According to a further embodiment, the winding system can be accommodated in slots of the stator, and the permanently excited magnet system in the form of permanent magnets is arranged in the stator and/or on the side of the teeth formed pole shoes formed by the slots facing the air gap of the ring motor. According to a further embodiment, the permanent magnets in the stator may be positioned in the teeth of the stator and/or in the yoke back. According to a further embodiment, the winding system may be formed from tooth coils, wherein at least every second tooth of the stator has at least one tooth coil which encompasses this tooth. According to a further embodiment, the stator and/or the rotor can be made up of segments. According to a further embodiment, the windings, which are designed as tooth coils, can be configured at separating points from one stator segment to another in such a way that, when joining the individual stator segments together at the separating points, a slot is formed in which the respective halves of two different tooth coils are located. According to a further embodiment, the toothed structure of the rotor can be solid and/or laminated and/or skewed. According to a further embodiment, one or more permanent magnets may be provided for each tooth. According to a further embodiment, the toothed structure of the rotor can be an integral multiple of the magnet pitch of the stator or is different from an integral multiple of the magnet pitch of the stator.

BRIEF DESCRIPTION OF THE DRAWINGS

The invention and further embodiments are described in more detail below with reference to schematically shown exemplary embodiments; in the drawing:

FIG. 3 shows a winding system according to the prior art,

FIG. 4 shows a winding system according to an embodiment with tooth coils,

FIGS. 5 to 8, 12, 14 to 18 show different embodiments of the stator and rotor in principle, FIGS. 9, 10, 11, 13 show diagrams to explain the physical correlation of the structure according to various embodiments.

DETAILED DESCRIPTION

According to various embodiments, a ring motor as a direct drive, particularly for ore mills or rod mills, may comprise a stator and a rotor configured as a rotating mill body, wherein the stator has at least two different excitation systems, and the mill body has a toothed structure, which electromagnetically interacts with the excitation systems of the stator and thus brings about a rotation of the mill body.

As a result of the design of the ring motor according to various embodiments, the stator now has two different excitation systems which were previously distributed between stator and rotor. Consequently, this dispenses with the laborious handling and assembly with pre-magnetized poles on the mill body and/or also the magnetization of these rotor segments on site.

In a further preferred embodiment, the stator is provided with a winding system which is designed in the form of a tooth-coil system, wherein each tooth, or each second tooth of the stator viewed in the circumferential direction, has its own preformed coil. Exhaustive electrical testing of the winding system of a stator segment can therefore already be carried out in the factory.

Advantageously, at the same time, the separating points of the stator segments are provided in a slot, preferably centrally in a slot, so that there are no flux changes of any kind due to missing tooth coils as a result of fitting the stator segments together.

If only every second tooth is wound, the separating point is provided in a non-wound tooth.

Advantageously, the toothed structure of the rotor is solid and is only fitted to the mill body in a simple manner, for example by means of screw fittings. Magnetization or assembly to the mill body with already pre-magnetized pole elements is therefore no longer necessary.

In a further embodiment, the toothed structure can also be laminated in order to avoid eddy currents. Advantageously, at the same time, the laminations or laminated sections are stacked axially.

In a further advantageous embodiment, the teeth on the mill body are skewed in an axial direction in order to avoid or at least reduce cogging between the poles of the rotor and the stator, which would otherwise act as torque variations in the drive system.

Figure 1:
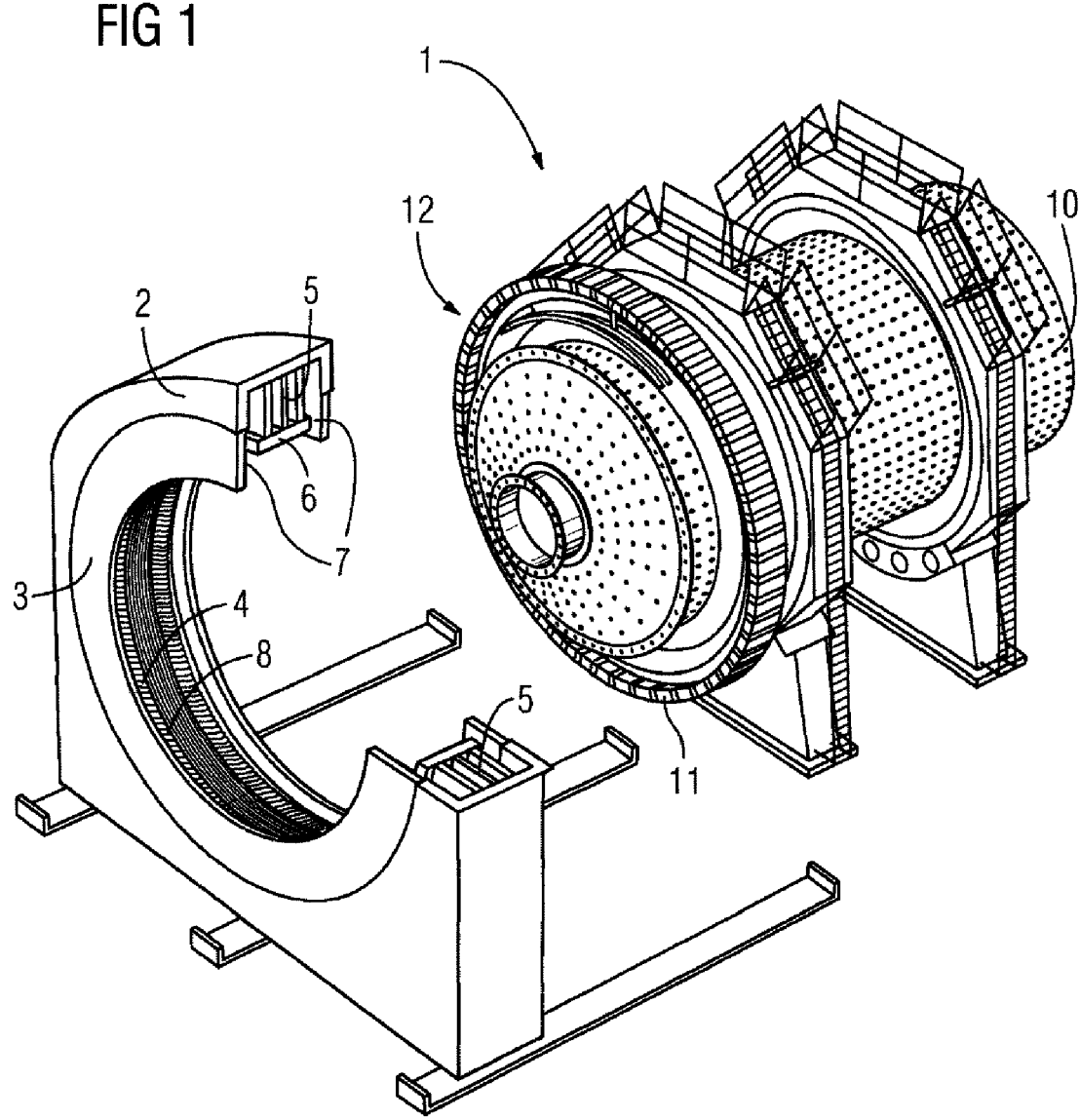
FIG. 1 shows a perspective diagram of a rod mill direct drive in principle.

In a schematic, perspective diagram, FIG. 1 shows the elements of a ring motor 1 in principle with its stationary part, in which the stator 6 is located, and the rotating part, with which a rotor 12 is located on a mill body 10 which is not shown in more detail.

The stator 6, which has axially stacked laminations, is fixed to a frame 2 by means of supporting elements 5, which are suitable both as a torque support and for vibration damping. The front faces of the stator 6 are provided with covers 3 to form a cooling channel 7 between the end winding of the winding system 4 and the cover 3, said cooling channel advantageously being suitable for air-cooling the end windings in particular. Here, the air flow is produced by one or more fans which are arranged on the circumference of the stator 6.

Figure 2:
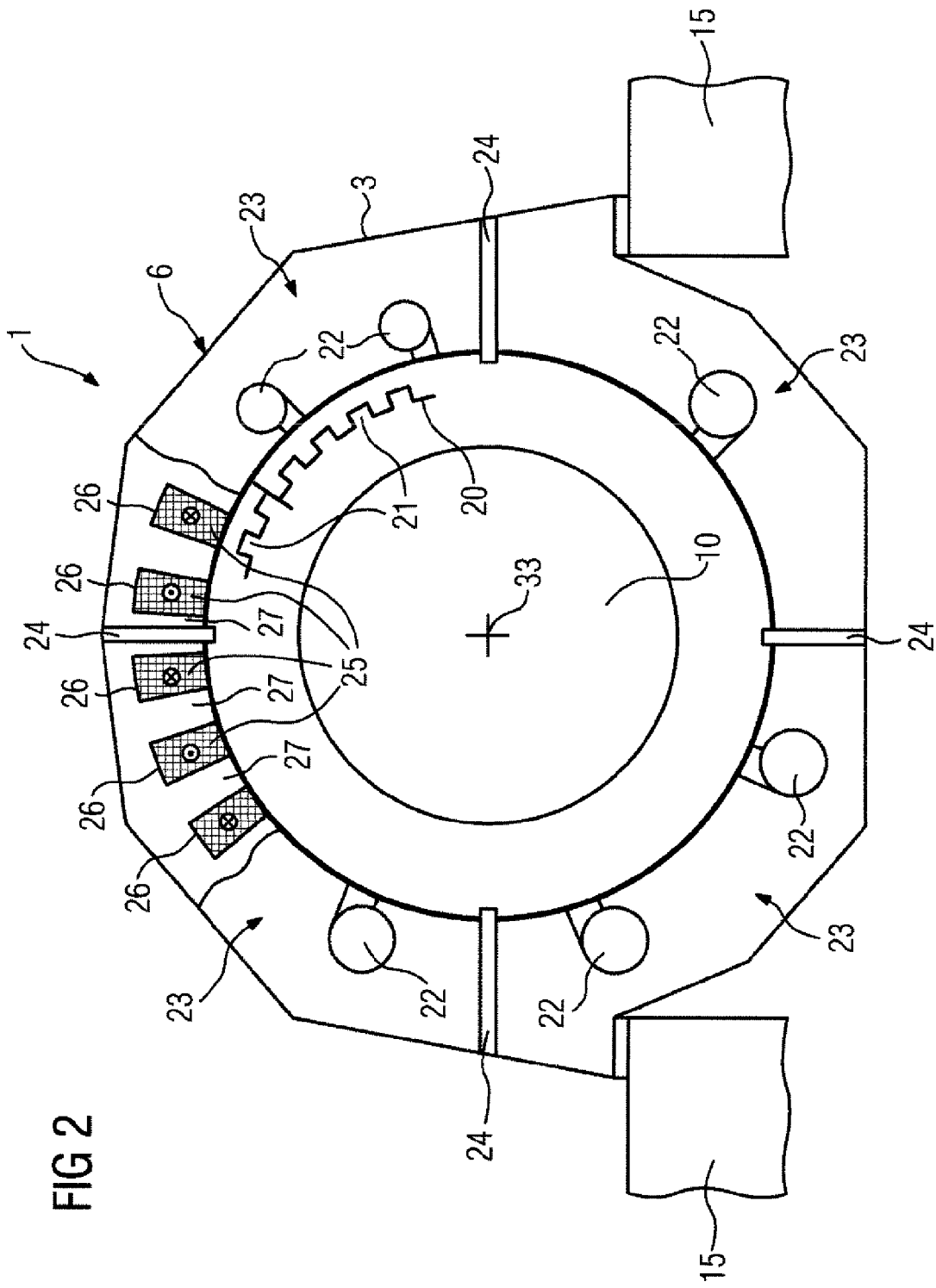
FIG. 2 shows a winding system in principle.

FIG. 2 shows the ring motor 1 in principle in a cross-section diagram, wherein the ring motor 1 rests with two contact surfaces on a foundation 15 so that the stator 6 of the ring motor 1 is freely suspended by means of the foundations 15. The mill body 10 is connected to a foundation, which is not important for understanding the invention and is therefore not shown in more detail, by means of mountings which are not shown in more detail.

A rotor 12 in the form of a toothed structure 20 is located on the mill body 10. Viewed in the circumferential direction, the rotor 12 is hence divided into individual rotor segments 21, which in themselves are each easy to transport and fit to the mill body 10. The rotor segments 21 are solid, that is to say designed in one piece or laminated and/or, which concerns the axial profile of the toothed structure 20, skewed with respect to the axis 33.

A skewed profile of the toothed structure 20 reduces the torque ripple, resulting in a more uniform rotation of the mill body 10.

Furthermore, the stator 6 is encapsulated by the cover 3, and individual fans 22 are distributed in the circumferential direction in order to be able to dissipate the heat selectively.

These fans 22 are shown schematically and, due to their number, guarantee that the cooling performance is evened out compared with a centrally arranged fan.

Furthermore, the cover 3 protects the stator 6 in particular against contamination, which could adversely affect the dielectric strength of the winding system 4.

The stationary part of the ring motor 1 is divided into four stator segments 23, for example, wherein the individual stator segments 23 can be mechanically connected to one another by means of separating points 24. According to FIG. 2, the stator 6 of the ring motor 1 is divided into four stator segments 23, as, because of its dimensions, the stator 6 can no longer be transported as a whole and must therefore be divided into individual segments.

Advantageously, the winding system 4 is made up of tooth coils 25. In doing so, the tooth coils 25 encompass only one tooth 27 in each case so that, as shown in FIG. 2, only one outgoing conductor or one return conductor of a tooth coil 25 is present in each slot 26. This results in teeth 27 which are encompassed by a tooth coil 25, and there are teeth 28 which are not encompassed by a tooth coil 25. Viewed in the circumferential direction therefore, there are alternately teeth which are wound and teeth which are not wound. The separating point 24 therefore runs through the non-wound tooth 28.

The permanent magnets, which in this embodiment are arranged in the air gap, are not shown in FIG. 2 for graphical reasons.

Here, the side of the non-wound teeth facing the air gap is designed to be as wide as or narrower than the non-wound teeth. Furthermore, the non-wound teeth are designed in one piece with the lamination of the respective stator segment, or as an individual part so that it can be positioned in a yoke back of the stator segment.

In a further embodiment, each tooth 27 is wound so that outgoing and return conductors of different tooth coils 25 are located in each slot 26. When each tooth 27 has a tooth coil 25, the separating point 24 is positioned in such a way that it runs centrally through a slot 26, and thus outgoing and return conductors of different tooth coils 25 are located in this separating slot in the assembled state of the ring motor 1.

As a result of the embodiments of the winding system of the stator segments, no winding systems 4 of any kind now have to be placed in the slots adjacent to the separating point 24 in the plant on site.

The complete winding system 4 can therefore be placed in the respective stator segment 23 in the factory, encapsulated, tested and subsequently transported to the plant.

It is no longer necessary to fit windings in the slots 26 of the stator 6 according to FIG. 3 surrounding the separating points 24. An insulation test in the plant is therefore superfluous.

According to FIG. 3, a significant number of preformed coils * are fitted so that they extend over the separating point 24 and can therefore only be fitted on site.

All that needs to be done in the plant is to make an electrical circuit of the individual stator segments 23, preferably with a 12-pulse converter which is known in itself.

Each stator segment 23 can therefore be completely fitted in the factory with the winding system 4 in the slots 26 and the permanent magnet or permanent magnets in or on the stator 6, and there subjected to a quality and insulation test.

In the following diagrams, for graphical reasons, a straight, that is to say non-curved, diagrammatical form is sometimes chosen, which however does not differ technically and physically from a curved form such as that on which a ring motor 1 is based.

Figure 5:
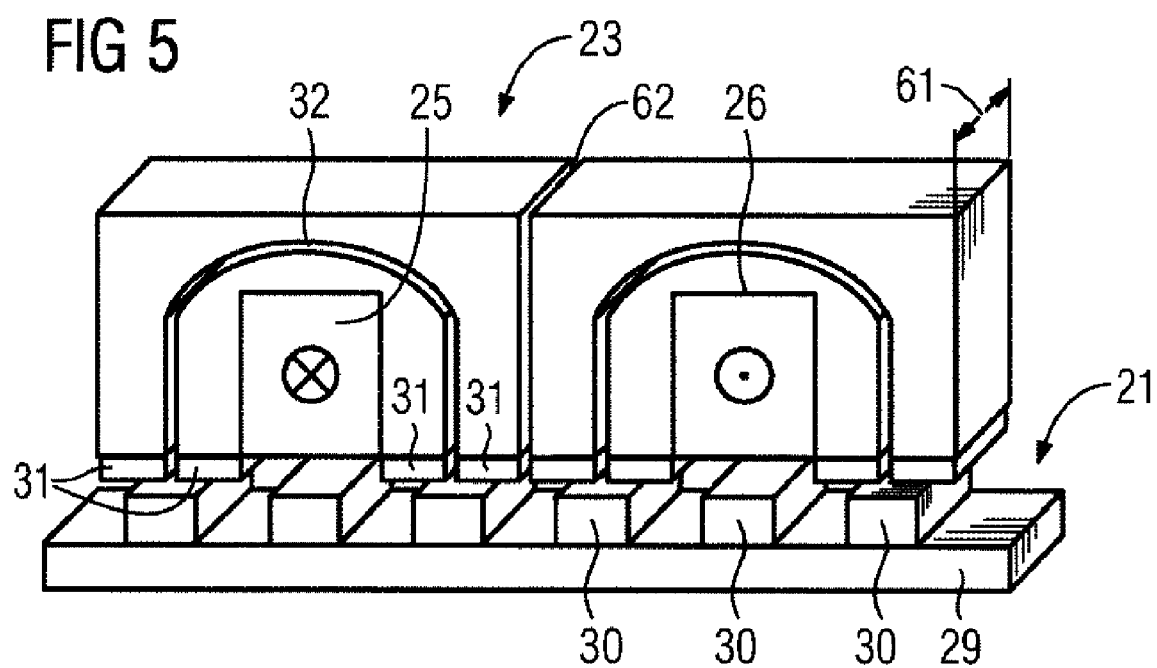

To further simplify the assembly of the ring motor 1, according to various embodiments, the rotor 12 has a toothed structure 20 according to FIG. 5, which is laminated both in the region of a rotor base 29 and in the region of the bars 30. In addition, to further simplify the assembly of the ring motor 1, the permanent magnets 31 are arranged on the stator 6 or stator segment 23. In particular, the permanent magnets 31 are arranged on the stator segment 23 in the plane of the air gap in strips. In this longitudinal flux version, the permanent magnets 31 are aligned essentially parallel to the bars 30, which act as flux guides. To reduce torque ripple, however, the permanent magnets 31 can be deliberately positioned in a kind of skewed orientation with respect to their actual axial profile.

This skewing is determined by the lamination and therefore the axial profile of the slots 26.

In a further advantageous embodiment, the toothed structure 20 is made from laminations which are stacked one behind the other over the axial length of the rotor 12. In doing so, the respective laminations of a rotor segment 21 with rotor base 29 and bars 30 are designed from one part, that is to say in one piece. Stacking the laminations one behind the other produces the toothed structure 20 of the rotor segment 21 with the bars 30. The type of lamination is indicated in FIG. 5.

The toothed structure 20 of the rotor 12 is made up in the circumferential direction by rotor segments 21 so that one rotor segment 21 adjoins the next rotor segment 21. Further adjoining rotor segments 21 of this kind in the direction of movement, that is to say in the circumferential direction, are however not shown in the diagram of FIG. 5. The diagram of FIG. 5 also shows the permanent magnets 31. The permanent magnets are N-S permanent magnets or S-N permanent magnets. These permanent magnets 31 extend, for example, over the width 61 of a complete axial lamination package of the stator 6. Pole gaps 62 are provided to reduce magnetic leakage.

Figure 6:
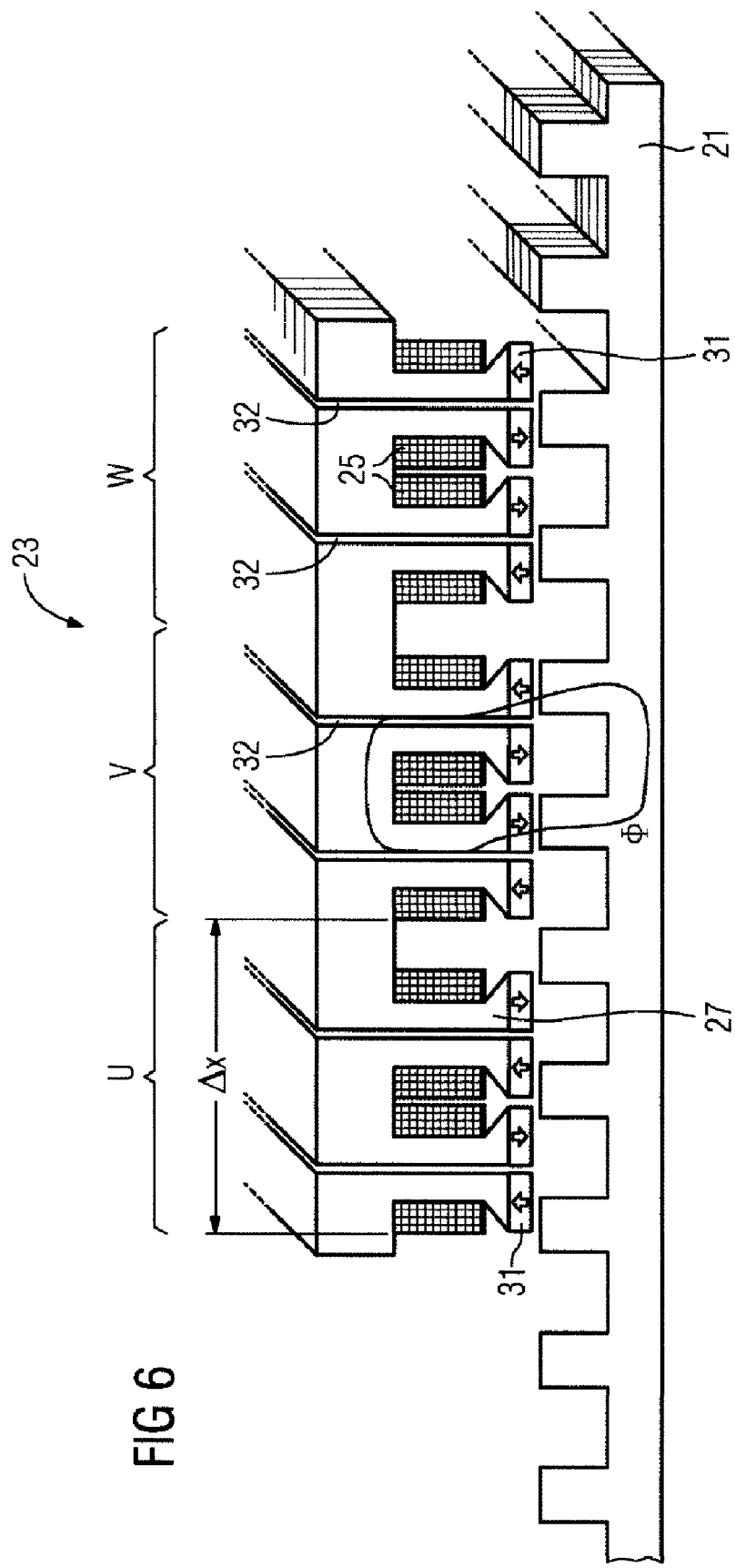

In a further embodiment according to FIG. 6, the stator 6 is designed in such a way that it has pole shoes 55 which face the air gap. The pole shoes 55 increase the contact area for permanent magnets 31. This enables the force produced by the ring motor 1 to be increased.

Further motor strands (e.g. V and W) are constructed in the same way. In the position shown, the permanent magnets 31 produce the magnetic excitation fluxes, the sum of which forms the flux linkage $\psi$ of the winding system 4.

Each strand U, V, W is provided for one phase of a three-phase network. The required phase shift is achieved by the geometrical offset of the strands with respect to one another. Here, the geometrical offset $\Delta x$ corresponds to 120° electrical for a three-strand machine for example. Not only is a tooth coil 25 of the winding system 4 associated with each strand U, V and W, but two or more tooth coils 25 are provided in each case for a strand U, V and W of the ring motor 1.

At the same time, the toothed structure 20 for each rotor segment 21 is designed in one piece.

Figure 7:
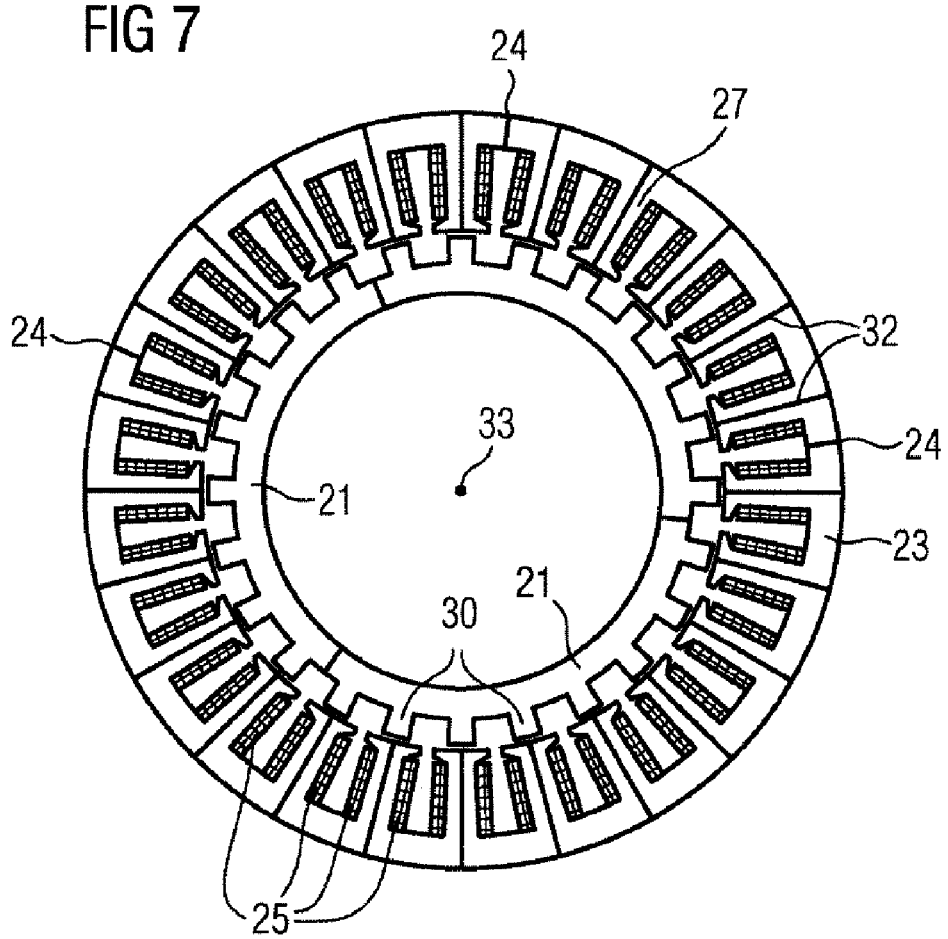

The diagram of FIG. 7 explicitly shows the ring shape of a possible ring motor 1 according to various embodiments. The ring motor 1, which can be designed as a synchronous motor, has a stator 6 and a rotor 12. The rotor 12 can be rotated about an axis 33, which is also the axis of the mill body 10 which in this case is not shown in more detail. The stator 6 has tooth coils 25 arranged around teeth with pole shoes 55, and permanent magnets 31. The stator segments 23 abut one another at the separating points 24 where they are mechanically connected to one another.

Figure 8:
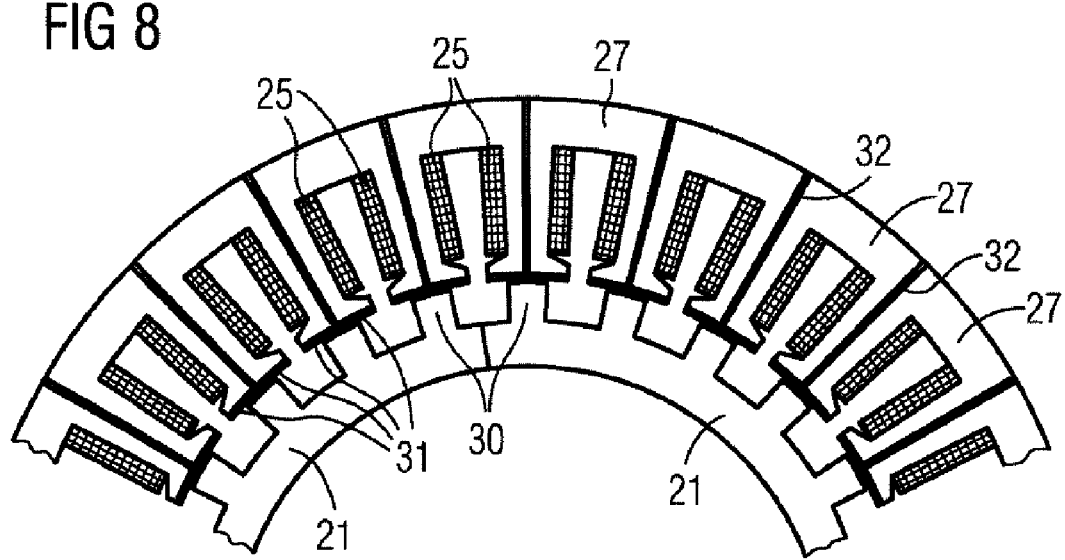

The diagram of FIG. 8 shows a detailed section of the diagram of FIG. 7. The positioning of the permanent magnets 31 in the air gap is shown in FIG. 8 in physical analogy to the previous embodiments.

Figure 9:
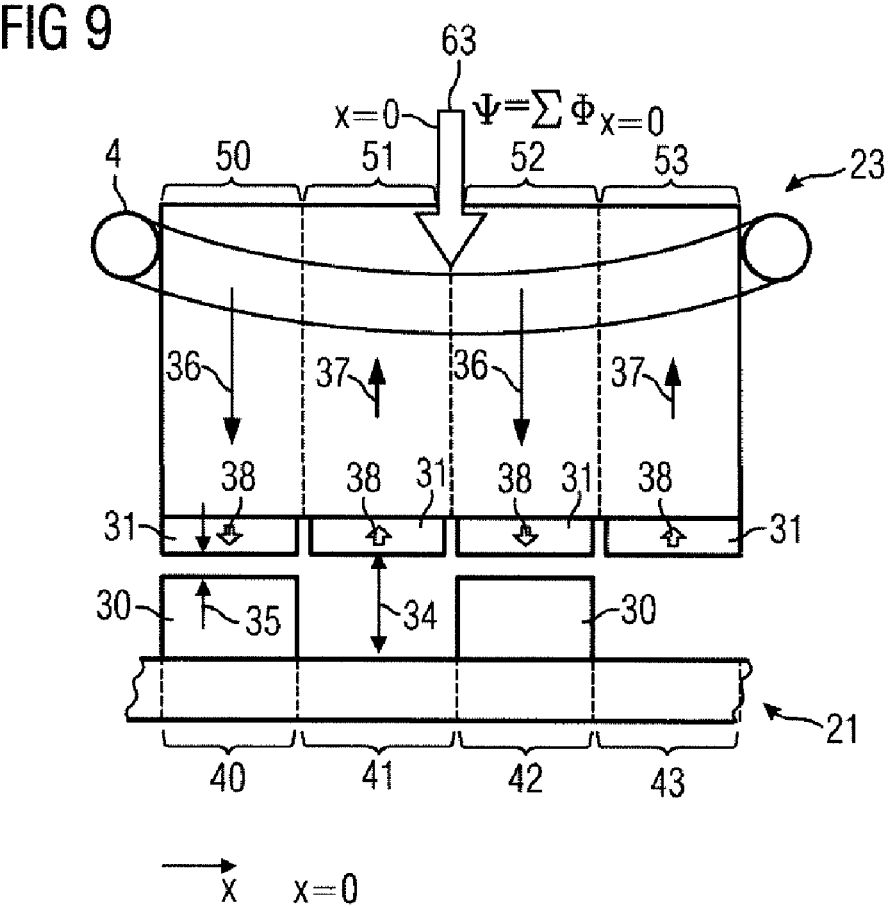

The diagram of FIG. 9 shows a section of the stator segment 23 and the toothed structure 20 of a rotor segment 21. This section shows schematically how magnetic fields in a stator 6 can divide, the form of a side view being chosen for the purpose. FIG. 9 shows one turn of the winding system 4. Furthermore, it shows that the section of the stator 6 and the toothed structure 20 can be divided into sections. The stator 6 has primary sections 50, 51, 52 and 53, wherein these primary sections refer to the permanent magnets 31. At the same time, these sections are areas in which the magnetic flux runs either away from the rotor segment 21 or towards the rotor segment 21 corresponding to the magnetization direction of the permanent magnets 31. The progression is shown by arrows 38.

The sum of all magnetic fluxes linked with the winding system 4 forms a linkage flux $\psi$. The linkage flux is mainly produced by the permanent magnets, which can form a magnetic return path via the rotor segment 21. The different length flux arrows 36, 37 show the flux linked with the winding system 4 (tooth coil) for each permanent magnet 31. The rotor segment 21 also has sections corresponding to the existing bars 30. These secondary sections 40, 41, 42 and 43 therefore correspond to the sections in which a bar 30 is present or not present respectively. A magnetic flux can be guided by the bars 30. A magnetic excitation flux, which for example can be produced by a north-south permanent magnet, closes via the bar 30 and the stator 6 in a section 50 in conjunction with the section 40. At the same time, behind a first north-south permanent magnet (N-S permanent magnet) for example, the stator 6 has a further permanent magnet which is magnetized in the opposite direction so that this is an S-N permanent magnet. A permanent magnet of this kind is not shown in FIG. 9 however, as this is arranged behind.

A narrow air gap 35 is produced at the positions where a bar 30 lies opposite a permanent magnet 31. A wide air gap 35 is produced in neighboring positions without a bar 33. As the air gaps 35 and 37 are not equal, magnetic fluxes 36 and 37 of different strengths are produced in sections 50, 52 and 51, 53 by permanent magnets 31. The resulting flux 63 is given by the sum of all fluxes 36 and 37.

Figure 10:
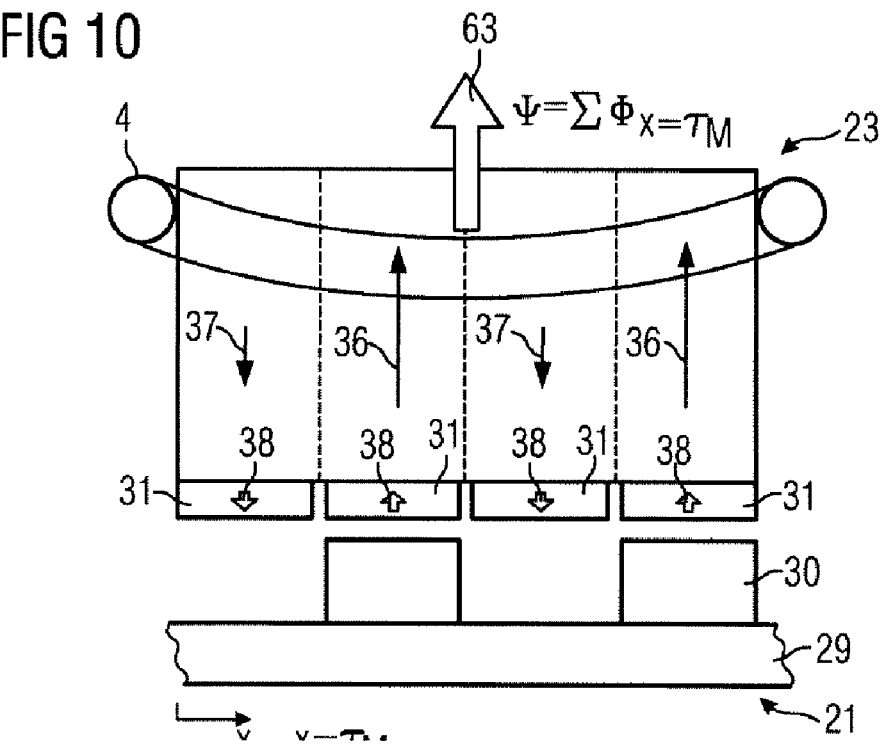
Figure 11:
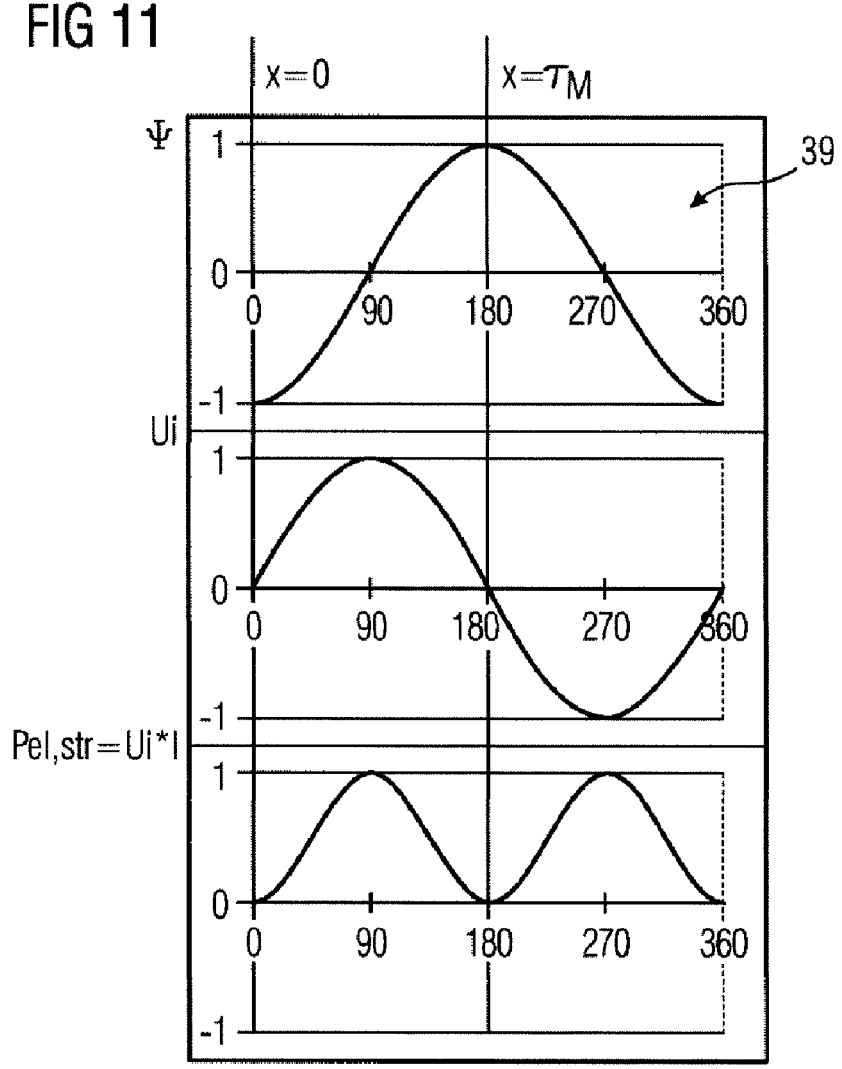

The diagram of FIG. 9 shows the magnetic excitation flux 36, 37 at the time and for the position of stator segment 23 and rotor segment 21 at which a current in the winding system 4 passes through zero. The position-dependent characteristic of the magnetic excitation flux and the voltage induced in the winding and the power of an energized motor that this produces are shown in FIG. 11. A negative linkage flux $\psi$ is produced for the position of the rotor segment 21 X=0 shown in FIG. 9; a positive flux $\psi$ is produced for the one position $X=\tau_M$, which is shown in FIG. 10. The diagram of FIG. 10 therefore shows the rotor segment 21 in a position $X=\tau_M$. If the rotor segment 21 therefore moves by one magnetic pole pitch, this causes the flux linkage 63 of the tooth coil 25 (winding system 4) to change gradually from a negative to a positive value.

The way in which the change progresses can be influenced by geometrical parameters such as permanent magnet width, air gap, tooth width (width of bars 30) etc. In an advantageous embodiment, a change which is as sinusoidal as possible is aimed for.

The diagram of FIG. 11 shows the magnetic linkage flux $\psi$, the resulting induced voltage $U_i$ and the electrical power $P_{el,str}$ of a strand/winding with respect to time in three graphs. The characteristic with respect to time is represented by specifying the phase position of the voltage. The progression of the flux $\psi$ also reflects the progression of the magnetic field, which can be produced, for example, by means of permanent magnets 31. For the optimum formation of force of a strand, the current must be impressed in phase with the induced voltage. The positions X=0 and $X=\tau_M$ are also shown, wherein these positions together with the progressions of flux $\psi$, voltage $U_i$ and electrical power $P_{el,str}$ which are also shown refer to the symbolic diagram of FIGS. 9 and 10. From the third graph, on which the electrical power is plotted, it can be seen that for a constant power (~ force) the number of motor strands m must be greater than and/or equal to two. Advantageously, three strands have been chosen, as three-strand converters require fewer semiconductor valves than two or multi-strand converters.

However, multi-strand systems can also be used for ring motor applications.

The diagram of FIG. 13 serves to illustrate the technical principle and illustrates the generation of a force F. An auxiliary model is presented in order to make the formation of force in the circumferential direction of a ring motor 1 a little clearer. A permanent magnet 31 is replaced by currents on a lateral surface associated therewith. The permanent magnet 31 can therefore theoretically be represented by a cuboid, for example, wherein current flows on the side surfaces of the cuboid 44 as shown. The permanent magnet 31 can therefore be represented in a model 45 by a winding, wherein, according to the model, the direction of the current within the winding is represented by a dot 48 or a cross 47. In diagram 2D, the permanent magnet is reduced to the conductor cross-section of the equivalent currents. If the permanent magnets are now substituted in the side view of the stator, this results in the subsequent arrangement.

The magnetic field generated by the winding system 4 is concentrated in the air gap 35 at the positions of the bars 30, which act as flux guides, as the magnetic resistance is lowest at these points. The notional conductors therefore lie in the field of the strand coil and strengthen it on one side and weaken it on the other. The conductors "move out" into the area of lower field strength, which is shown with the direction of the force F acting on the stator in FIG. 13. This correlation is also described by the "right-hand rule", in which the current, the magnetic field and the force F are at right angles. In the position $X=\tau_{M/2}$ of stator 6 and rotor segment 21 relative to one another shown in FIG. 13, the strand current, that is to say the current through the winding, i.e. the tooth coil 25, reaches its maximum.

Figure 12:
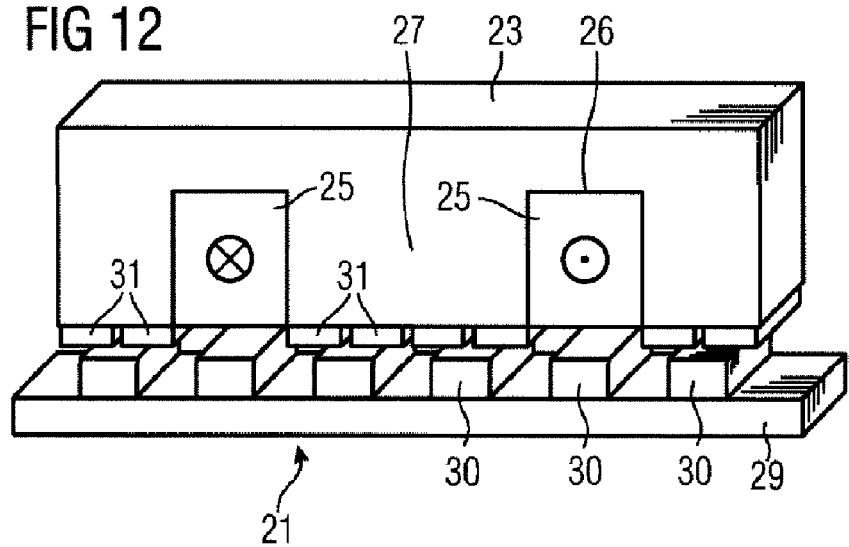

The diagram of FIG. 12 shows a stator segment 23 and a rotor segment 21 which represent a schematized part of a ring motor 1.

According to FIG. 12, the rotor segment 21 is laminated both in the region of the rotor base 29 and in the region of the bars 30. The permanent magnets 31 are arranged in the plane of the air gap in strips. In this longitudinal flux version, the permanent magnets 31 are aligned essentially parallel to the bars 30 (flux guides). To reduce torque ripple, the permanent magnets 31 and therefore the profile of the slots 26 can be arranged skewed by a specifiable angle with respect to their axial alignment.

The part of a stator segment 23 has a tooth coil 25, permanent magnets and straight, i.e. with parallel slot edges, wound teeth 27.

The permanent magnets 31 are N-S permanent magnets or S-N permanent magnets. These permanent magnets 31 extend, for example, over the width 77 of a complete lamination package of the stator 6. However, in principle, the permanent magnets 31 can also be divided into several part-magnets in their axial extension and/or in their extension in the circumferential direction. This is particularly advantageous for reducing eddy currents within the permanent magnets 31.

The diagram of FIG. 14 shows a further possible embodiment of a ring motor 1 in schematic representation. Here, the stator segment 23 has pole shoes 55. The pole shoes 55 increase the contact area for permanent magnets 31. This enables the force produced by the electrical machine to be increased. As the area in which a winding system 4, in particular a tooth coil 25, can be placed in the stator 6 or stator segment 23 is reduced by increasing the area for positioning the permanent magnets 31, e.g. compared with the embodiment of FIG. 12, the tooth is advantageously designed with a winding former 56.

The winding former 56 has a pole shoe 55 and also a winding neck 57. A winding can be wound or a pre-manufactured tooth coil 25 can be positioned around the winding neck 57, wherein the wound winding former 56 can then be positioned in the stator segment 23. The winding former 56 is advantageously fixed to the stator segment 23 by means of lugs or dovetail-like elements.

In FIG. 14, the winding is designated as strand U of a ring motor 1. Further motor strands (e.g. V and W) can be realized by means of identically structured stator segments 23, but are not shown. In the position shown, the permanent magnets 31 produce the magnetic excitation fluxes, the sum of which forms the flux linkage $\psi$ of the tooth coil 25.

In a further embodiment, the winding former 56 is likewise divided into two in order to ensure easy assembly of the tooth coils on the stator segment 23. In doing so, the winding neck 57 forms a unit with the yoke back 65 and, after assembly of the tooth coil 25 on the winding neck 57, the pole shoe 55 is positioned and fixed to the winding neck 57 by the above-mentioned fixing means.

FIG. 15 shows part of a stator and rotor segment 21 of a ring motor 1 with a longitudinal-flux magnetic circuit in schematic representation. This corresponds to the diagram of FIG. 14, wherein only the winding former 56 is connected in one piece to the stator segment 23. This results in the tooth coil 25 having to be introduced into the slot 26 bit by bit via the slot opening 64.

Figure 16:
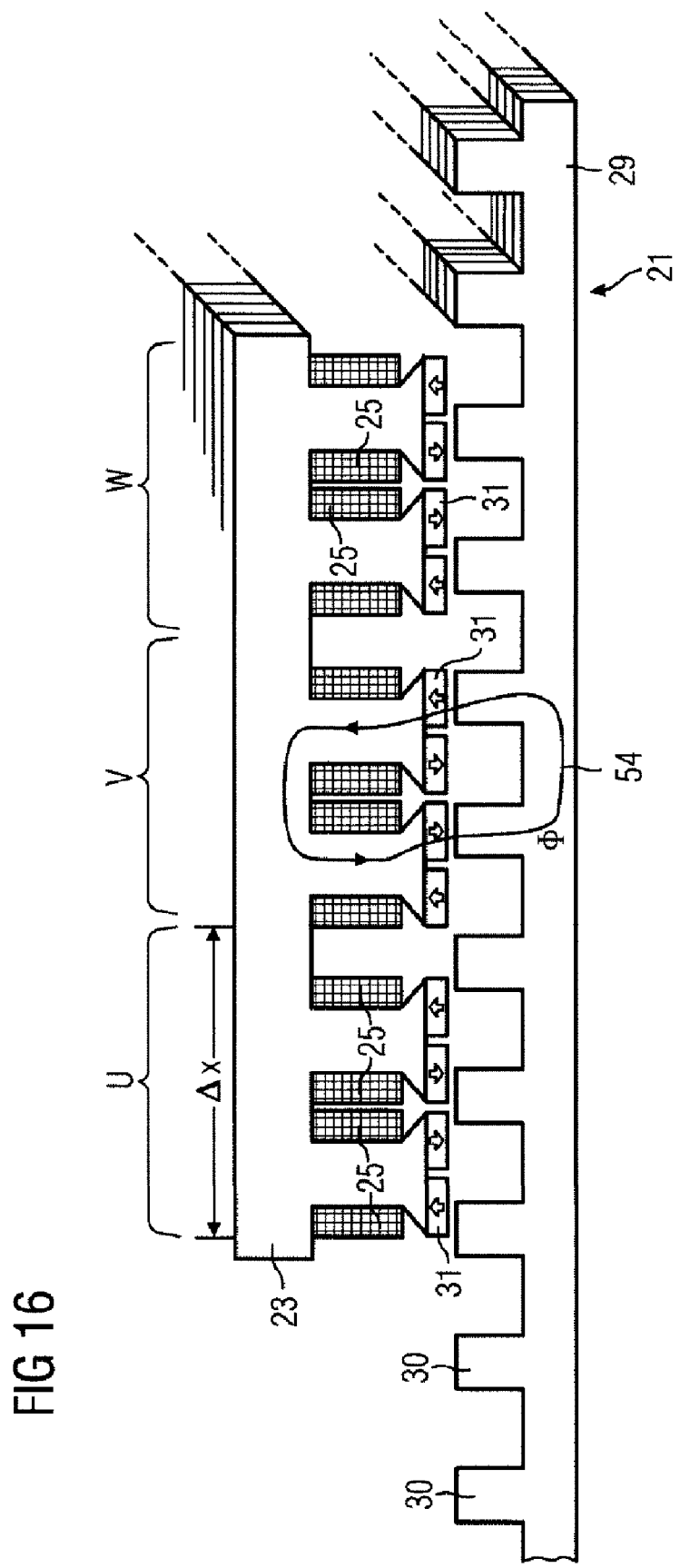

The diagram of FIG. 16 shows a multi-strand arrangement of a ring motor 1. Each strand is provided for one phase of a multi-phase network, e.g. a three-phase network. The required phase shift is achieved by the geometrical offset of the strands with respect to one another. Here, the geometrical offset Δx corresponds to 120° electrical for the three-strand machine shown. In this diagram, two tooth coils 25 are associated with each strand U, V and W of the stator segment 23. In principle, the number of strands and/or the number of tooth coils 25 per strand is not limited, but there is an upper limit imposed by practical feasibility.

Figure 17:
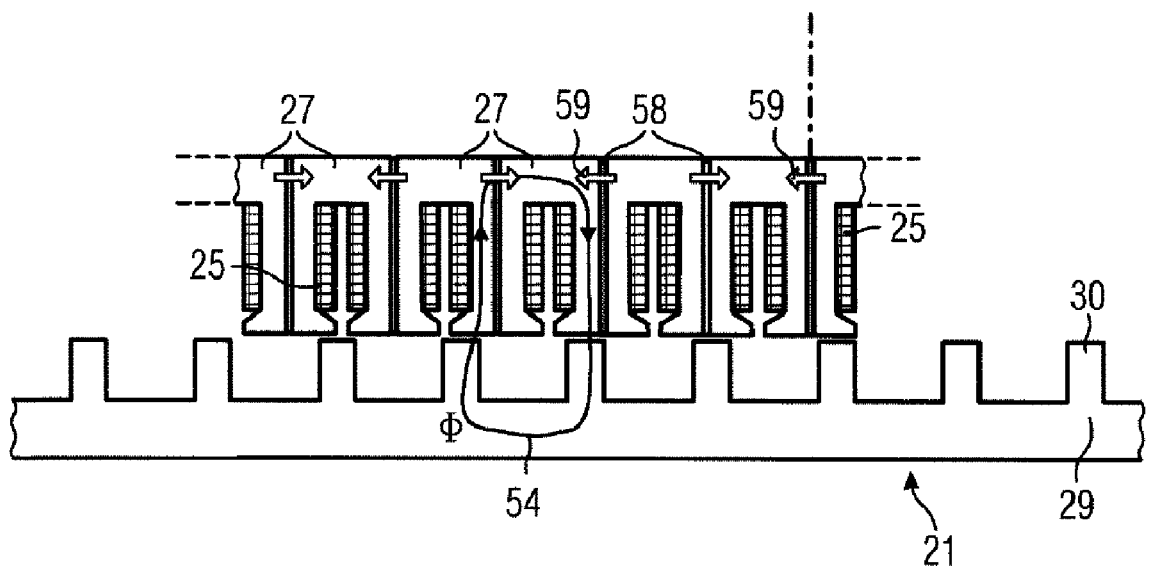

The diagram of FIG. 17 shows a further embodiment of a ring motor 1, where in this case tooth magnets are used as permanent magnets 31. The tooth magnets 58, which are also permanent magnets, are located between laminated soft iron material, for example. The additional magnetic field 54 produced by the tooth magnets 58 is indicated by lines with arrows. The magnetization direction 59 of the permanent magnets 31 is likewise illustrated by arrows. The tooth magnets are essentially positioned centrally in a tooth and essentially run parallel to a coil axis of the tooth coil 25. The tooth 27 is encompassed by a tooth coil 25. The magnetic excitation field is the additional magnetic field which is produced by means of the tooth magnets 58. This structural arrangement leads to the flux being concentrated at the air gap. The flux concentration is determined by the geometry of the magnetic circuit. Examples of influencing variables are the dimensions of the permanent magnets 31 and the lamination dimensions. The magnetization direction 59 of the tooth magnets 58 (the tooth magnet is a permanent magnet 31) is mainly parallel to an air gap plane of the air gap.

The tooth pitch of the rotor segment 21 of the ring motor 1 according to FIG. 17 is not an integral multiple of the magnet pitch of the stator segment 23. In particular, this applies to the mean value if the tooth or magnet pitch is not constant.

The winding system 4, in particular the arrangement of the tooth coils 25, is likewise single or multi-stranded. The assignment of the tooth coils 25 to individual motor phases depends on the selected tooth pitch ratio between the stator 6 and the rotor 12. The diagram of FIG. 17 shows a different tooth pitch for the teeth 27 of the stator 6 than for the teeth of the rotor 6, which are formed by the bars 30.

At the same time, a multi-phase ring motor 1 can be realized both for an equal and for an unequal tooth pitch on the stator 6 and rotor 12. An equal tooth pitch is shown by way of example in FIG. 14 and FIG. 15.

Figure 18:
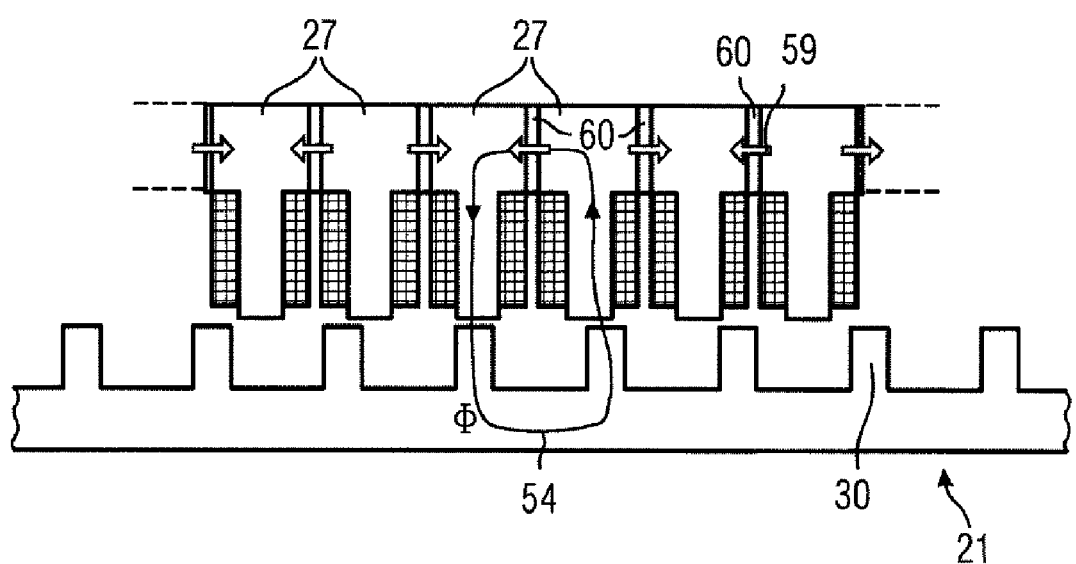

The diagram of FIG. 18 differs from the diagram of FIG. 17 essentially in that, instead of tooth magnets 58, yoke magnets 60 are now used as further means for producing further magnetic fields. The yoke magnets 60 are also permanent magnets 31 and are positioned in the region of a yoke. The yoke is used to connect teeth 27. In FIG. 18, a different excitation field results from the position of these magnets compared with FIG. 17.

The diagram of FIGS. 17, 18 shows a stator 6 of a ring motor 1 which is made up of individual teeth, wherein each tooth has a tooth coil and wherein the tooth elements are connected by magnetic elements. This enables the flux to be strengthened and no permanent magnets of any kind or other electrical excitation system have to be provided on the mill body 10. Only the toothed structure 20 is provided here.

As shown in FIG. 14 or 15, several permanent magnets 31 can also be provided on each tooth head. However, in doing so, the problem arises of inserting the tooth coils 25 into the existing slots 26 if the tooth head is widened. This problem can be circumvented by fitting the winding neck 57 of the tooth as a whole with its permanent magnets in advance with the tooth coil and positioning it in a yoke back 65 by means of dovetail joints.

In this case too, it is advantageous to provide flux barriers 32 between permanent magnets 31 of a pole shoe 55 with different magnetization direction in order to avoid "magnetic short circuits".

According to various embodiments, the ring motor 1, as a direct drive for ore mills or rod mills, is designed in segments viewed in the circumferential direction both with regard to the stator 6 and the rotor 12.

In the assembled state, i.e. when the rotor segments 21 are assembled together on the mill body 10, the rotor has only one toothed structure 20.

This toothed structure 20 is formed by a rotor base 29 and bars 30 thereon pointing radially in the direction of the air gap of the ring motor. At the same time, the toothed structure 20 of each rotor segment 21 is designed in one piece and is solid, and for all intents and purposes forms a single part.

Furthermore, the toothed structure 20 of a rotor segment 21 can also be created by laminations arranged axially behind one another. In doing so, each lamination is also designed in one piece, and rotor base 29 and bars 30 of a lamination form one part.

In addition, both the bars 30 and the rotor base 29 can also be designed as separate parts, regardless of whether the rotor segment 21, i.e. so that the individual parts rotor base and bars 30 are solid and/or laminated.

The following variations of a rotor segment 21 can therefore be produced. Rotor base 29 and, as a separate part, bars 30 laminated. Rotor base 29 solid and bars 30 laminated. Rotor base 29 laminated and at least one bar 30 solid.

The stator 6 of the ring motor 1 is made up of stator segments 23, wherein each stator segment 23 has tooth coils 25. At least one tooth coil 25 is located on each tooth or every second tooth. The teeth are therefore all wound with at least one tooth coil 25 in each case, or only every second tooth viewed in the circumferential direction is wound with at least one tooth coil 25 in each case.

The stator segment 23 is laminated or sintered.

The slots of the stator 6 either have parallel sides or at least the wound teeth have a widening of the pole shoes 55 in the direction of the air gap.

The tooth coils 25 are fitted onto the teeth of the stator segment 23 from the later air gap side over the pole shoes 25 and in the case of the narrowed slot openings 64 by introducing bit by bit or by designing a tooth in several parts as a winding former 56. At the same time, the pole shoe 55 can either be positioned on the winding neck 57 or the winding neck 57 can be positioned on the yoke back 65.

The permanent magnets 31 are located on the side facing the air gap or in the stator 6 in the teeth 27 in the form of tooth magnet 58, or in the yoke back in the form of yoke magnet 60, and can be designed in one piece or in several parts. The magnetization direction of the remnant magnets 31 can be selected at will; flux barriers 32 must be provided depending on the arrangement.

At the same time, the pitch of the toothed structure 20 of the rotor 12 is an integral multiple of the magnet pitch of the stator 6, as is shown in FIG. 14 and FIG. 15 for example, or the toothed structure 20 of the rotor 12 is different from this integral multiple of the magnet pitch of the stator 6, as is shown in FIG. 16 for example.

This enables a specifiable torque ripple to be deliberately selected or accordingly prevented.

Furthermore, the toothed structure 20 is filled with suitable material, e.g. with plastic, between the bars 30 in order to avoid an accumulation of dirt.

The toothed structure 20 can be formed by bars 30 which are spaced apart from one another, wherein the gap between the bars 30 is equal to the width of the bars 30. However, this gap can also be greater than or less than the width of the bars 30.

Furthermore, it is also possible to realize different bar spacings viewed in the circumferential direction. This is achieved in particular by means of individual rotor segments 21, each having defined and different bar spacings.

Different motor characteristics can therefore be produced with different bar spacings by replacing the rotor segments 21.

These listed variations of stator 6, stator segments 23, embodiments of the teeth of the stator 6, rotor 12, rotor segments 21, toothed structure 20, materials of stator 6 and rotor 12, embodiments of the permanent magnets 31, material and spacings of the bars 30 etc. can be implemented in any combination when realizing a ring motor 1 in the MW range (from a few MW to over 20 MW) by means of the embodiments already shown.

The invention claimed is:

1. A ring motor as a direct drive for ore mills or rod mills, comprising a stator and a rotor configured as a rotating mill body, wherein the stator has at least two different excitation systems, including a winding system and a permanent magnet system, and the mill body has a toothed structure that electromagnetically interacts with the excitation systems of the stator and thus brings about a rotation of the mill body;

wherein the stator is comprised of a plurality of physically distinct stator segments, each having a partial-circle shape and including at least three teeth, each tooth having at least two permanent magnets coupled thereto;

wherein the plurality of partial-circle shaped stator segments are arranged adjacent to each other to form a circle shaped stator and wherein each of the stator segments defines separating points, wherein, adjacent ones of the stator segments are mechanically joined together at respective separating points thereof, wherein a pair of adjacent stator segments define a slot between the pair of adjacent stator segments at the separating point between adjacent stator segments; and wherein the winding system comprises tooth coils configured such that respective portions of two different tooth coils are located in the slot defined by the pair adjacent stator segments.

2. The ring motor according to claim 1, wherein the winding system is accommodated in slots of the stator, and each of the permanent magnets of the permanent magnet system is arranged on a pole shoe facing an air gap of the ring motor.

3. The ring motor according to claim 1, wherein at least one tooth of the stator is encompassed by at least one tooth coil.

4. The ring motor according to claim 1, wherein the rotor is made up of rotor segments.

5. The ring motor according to claim 1, wherein the toothed structure of the rotor is at least one of solid, laminated, and skewed.

6. The ring motor according to claim 1, wherein the toothed structure of the rotor is an integral multiple of a magnet pitch of the stator or is different from an integral multiple of the magnet pitch of the stator.

7. A ring motor as a direct drive for ore mills or rod mills, comprising a stator and a rotor configured as a rotating mill body, and the mill body electromagnetically interacts with the excitation systems of the stator and thus brings about a rotation of the mill body, wherein the stator is comprised of a plurality of physically distinct stator segments, each having a partial-circle shape and including at least three teeth, each tooth having at least two permanent magnets coupled thereto;

wherein the plurality of partial-circle shaped stator segments are arranged adjacent to each other to form a circle shaped stator and wherein each of the stator segments defines separating points, wherein adjacent ones of the stator segments are mechanically joined together at respective separating points thereof, wherein a pair of adjacent stator segments define a slot between the pair of adjacent stator segments at the separating point between adjacent stator segments; and wherein the stator comprises a winding system including tooth coils configured such that respective portions of two different tooth coils are located in the slot defined by the pair adjacent stator segments.

8. The ring motor according to claim 7, wherein the winding system is accommodated in slots of the stator, and each of the permanent magnets of the permanent magnet system is arranged on a pole shoe facing an air gap of the ring motor.

9. The ring motor according to claim 7, wherein the winding system is formed from tooth coils that encompass at least some of the teeth of the stator.

10. The ring motor according to claim 7, wherein the rotor is made up of rotor segments.

11. The ring motor according to claim 7, wherein the toothed structure of the rotor is at least one of solid, laminated, and skewed.

12. The ring motor according to claim 7, wherein a toothed structure of the rotor is an integral multiple of the magnet pitch of the stator or is different from an integral multiple of a magnet pitch of the stator.

13. A set of stator segments for a circular-shaped multi-segment stator of a ring motor including at least two different excitation systems for rotating a rotor, the multi-segment stator comprising:

a first stator segment; and
a second stator segment;
wherein each of the first and second stator segment has a generally partially-circular shape and includes:
a series of at least three teeth arranged along the generally partially-circular shape, the teeth defining a series of slots between adjacent teeth, each tooth having at least two permanent magnets coupled thereto; and
a winding system including tooth coils arranged around each of the teeth, and
wherein the first and second partially-circular stator segments are configured for connection to each other, such that of upon connection of the first and second stator segments, both (a) a portion of one of the coils arranged around one of the teeth of the first stator segment and (b) a portion of one of the coils arranged around one of the teeth of the second stator segment are disposed in a joint slot defined between the connected first and second stator segments.

* * * * *